United States Patent Office 3,385,369
Patented May 28, 1968

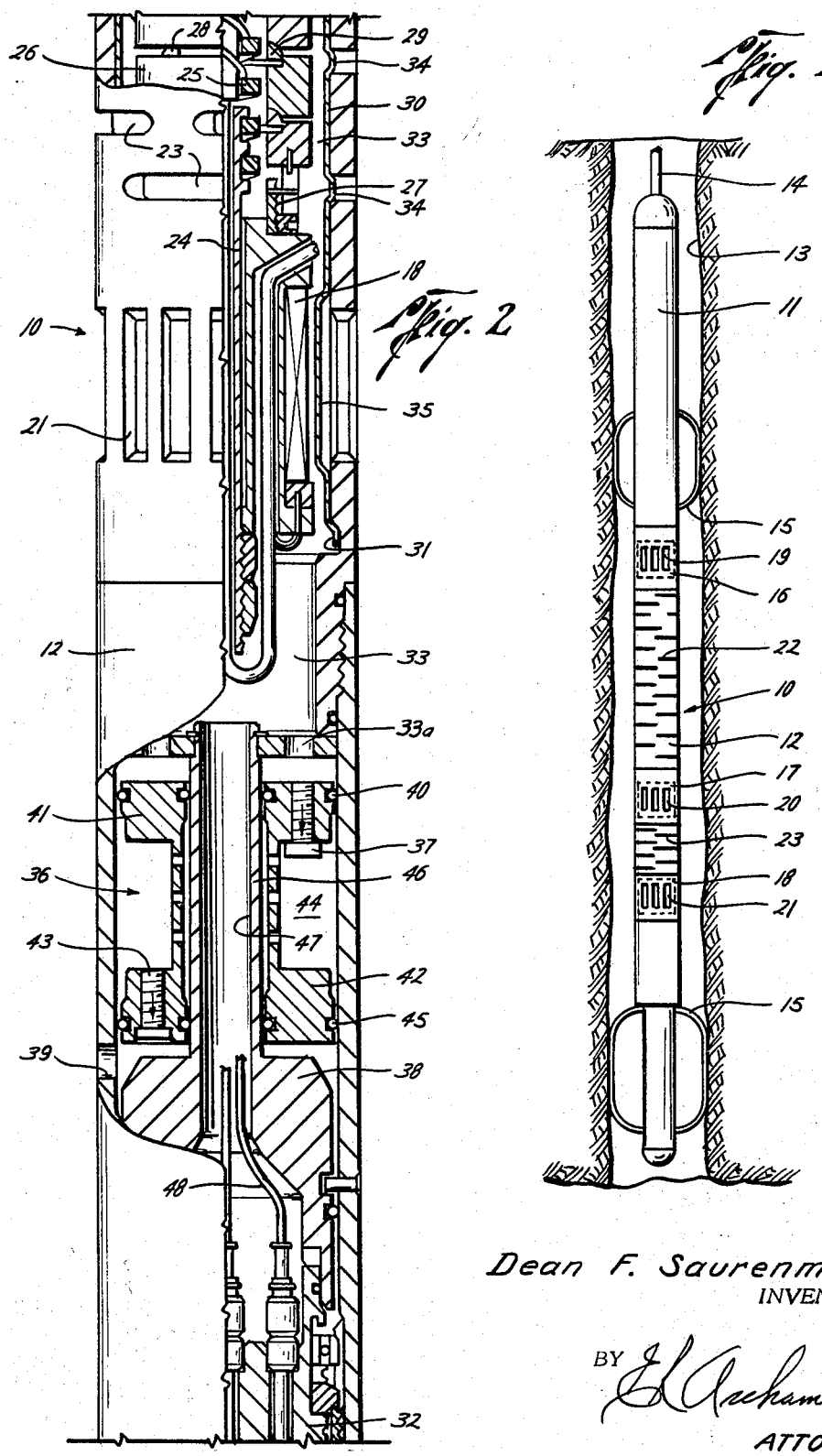

3,385,369
PRESSURE-EQUALIZING APPARATUS
FOR WELL TOOLS
Dean F. Saurenman, Galveston, Tex., assignor to Schlumberger Technology Corporation, Houston, Tex., a corporation of Texas
Filed July 1, 1966, Ser. No. 562,380
5 Claims. (Cl. 166—224)

This invention relates to well tools; and, more particularly, to means for providing gas-tight enclosures for well tools and maintaining their interiors at a pressure equal to the exterior pressure and free of contaminants.

It has become well accepted that valuable information can be obtained by measuring the velocity of sonic waves passing through earth formations surrounding a well bore. To obtain these measurements, a typical sonic logging tool is usually comprised of at least three sonic transducers mounted on a support at longitudinally spaced intervals from one another. One of these transducers acts as a transmitter which periodically emits pulses of sonic energy into the formations surrounding the logging tool that are detected by the remaining transducers. Upon the detection of a sonic pulse by the receiver nearest the transmitter, a timing circuit is activated. Then, when the same pulse is subsequently detected by the more distant receiver, the timing circuit measures the elapsed time to determine the velocity of sound through that portion of the surrounding media between the receivers. In more sophisticated systems, the wave forms of the detected pulses are also analyzed to determine amplitudes and other useful information.

The sonic transducers usually employed for these tools are either piezoelectric or magnetostrictive elements. When one of these transducers is used as a transmitter, it is electrically excited to generate a sonic wave. On the other hand, when a transducer is used as a receiver, it responds to sonic energy impinging thereon to generate an electrical signal that is substantially proportional to the intensity of this sonic energy. For effective operation of these transducers, it is preferred that they be arranged in some manner to provide an efficient transfer of energy to and from the surrounding media and, at the same time, be protected from the deleterious effects of the well bore fluids. These requirements naturally present problems, especially in view of the temperatures and pressures encountered when the logging tool is operated.

Heretofore, one of two approaches have usually been taken to enclose a sonic logging tool. In one manner of practice, the transducers are enclosed within an elastomeric cover, with the enclosed space being filled with a suitable oil to efficiently "couple" the transducers to the well bore fluids for transfer of sonic energy. While such enclosures are liquid-tight, they do not, however, prevent dissolved gases in the well bore fluids from permeating through the elastomeric cover. Although these gases do no harm initially, when the logging tool is withdrawn from the well bore, the entrapped gases usually can not be exhausted from the enclosure at a rate sufficient to prevent bursting of the cover.

In another manner of enclosing a sonic logging tool, the transducers are submerged in a suitable oil-filled, thin-wall, metal sleeve that is itself sufficiently elastic to efficiently transfer sonic energy to and from the well fluids. As shown in the Moser and Baker Patent No. 3,213,415, to equalize the pressure within the logging tool with that in the well bore, a double bellows is arranged on the housing and allowed to expand and contract as necessary to compensate for thermal expansion of the oil inside of the tool. Although this latter arrangement has been quite successful, it nevertheless presents a maintenance problem. For example, after prolonged use of such a logging tool in a well bore having particularly dirty fluids therein, foreign matter and the like will collect between the exterior convolutions and, in time, retard the contraction and expansion of the bellows as well as present a problem for cleaning whenever the tool is being reconditioned. Moreover, since a large volume of oil must be confined within the enclosure, when such a tool experiences considerable temperature variations, the total volumetric expansion can be quite substantial. Thus, a particularly large bellows is required to accommodate such substantial volumetric displacements.

Accordingly, it is an object of the present invention to provide new and improved means for maintaining the interior of a well tool gas-tight as well as accommodating for substantial volumetric changes in the tool from temperature variations.

This and other objects of the present invention are accomplished by arranging on a well tool having an enclosed chamber pressure-equalization means including a piston chamber filled with a suitable hydraulic fluid and in fluid communication with the enclosed chamber and having disposed therein first and second slidable piston members that are spaced apart and connected to one another. Normally-closed bypass means are arranged on each of the piston members to open as required and discharge the hydraulic fluids from within the well tool but to prevent entry of exterior contaminants and fluids.

The novel features of the present invention are set forth with particularity in the appended claims. The operation, together with further objects and advantages thereof, may best be understood by way of illustration and example of certain embodiments when taken in conjunction with the accompanying drawings, in which:

FIG. 1 depicts a sonic logging tool arranged in accordance with the principles of the present invention; and FIG. 2 is an enlarged cross-sectional view of a portion of the tool depicted in FIG. 1 and showing the present invention.

Turning now to FIG. 1, an elongated, rigid sonic logging tool 10 having an upper and a lower housing 11 and 12 and including the present invention is shown as it might appear within a well bore 13. The tool 10 is suspended from an armored electrical cable 14 that is spooled from a winch (not shown) at the earth's surface in the usual manner. If it is desired to maintain the tool 10 centered in the well bore 13, one or more centralizers 15 may be mounted on the tool as required.

Inasmuch as the particular sonic logging system used here is of no consequence here, to simplify the explanation of the invention, it will be assumed that a single transmitting transducer 16 and two receiving transducers 17 and 18 are mounted in the lower housing 12 of the tool 10 and most, if not all, of the electronic circuitry is mounted in the upper housing 11. Typical of such logging systems is that described in Patent No. 3,231,041 to Frank P. Kokesh. Briefly stated, in the Kokesh system, a keying circuit periodically triggers the transmitter 16 to emit a short pulse of sonic energy. At the same time, a pulse generator is conditioned to operate after a predetermined delay but certainly before an emitted pulse of sonic energy could have traveled through the adjacent earth formations and reached the receivers 17 and 18. When the first receiver 17 detects a sonic signal, an electrical signal produced thereby triggers the pulse generator to provide a first output pulse which simultaneously starts a multivibrator as well as enables a second pulse generator. Then, whenever the sonic signal is detected by the second receiver 18, it triggers the now-enabled second pulse generator to produce a second output pulse that stops the multivibator. The time interval between the first and second output pulses is then converted by a timing circuit into an analogue signal that is transmitted to the surface by way of the cable 14.

The velocity of sound through liquids typically found in a well bore (usually so-called "muds") is in the order of only 5,000-feet per second. On the other hand, the velocity of sound through earth formations will range from about 5,000-feet per second to about 25,000-feet per second. By way of comparison, most metals have a sonic velocity of about 13,000 to 20,000-feet per second. Accordingly, since the velocity of sound through earth formations is substantially higher than that through mud or other well bore fluids, a sonic signal will travel much faster through a formation than it will through the well bore. By properly spacing the transducer 16–18, therefore, the receivers 17 and 18 will detect a sonic signal that has passed through the adjacent earth formations long before the signal can pass directly through the fluids in the well bore 13. Thus, by selectively operating the receivers 17 and 18 only long enough to receive those signals passing through the formations, the slower and unwanted signals will not be detected.

It will also be recognized that the sonic logging tool 10 must be so arranged that detectable sonic energy will not be transmitted longitudinally along the body of the tool between the transducers 16–18 at a velocity comparable to that of sound through earth formations. Obviously, if this is not done, unwanted sonic signals will pass along the body of the tool 10 and arrive at the receivers 17 and 18 as desired signals are being received and prevent an accurate determination of the composite velocity of sound through the adjacent earth formations.

Accordingly, the lower housing 12 itself is of metal and is arranged in accordance with Patent No. 3,191,141 to Nick A. Schuster. Three groups of circumferentially spaced longitudinal slots 19–21 are formed along the housing 12 adjacent to a respective one of the transducers 16–18 and two groups of particularly arranged peripheral slots 22 and 23 are formed around the lower housing between the transducers. As more fully described in the Schuster patent, these vertical slots 19–21 provide "windows" through the which sonic signals may pass radially with little or no interference to and from the transducers 16–18. On the other hand, the peripheral transverse slots 22 and 23 are appropriately spaced and staggered to substantially interrupt the longitudinal continuity of the housing. By breaking up any direct longitudinal paths along the lower housing 12 itself, only greatly lengthened and tortuous paths are left through which sonic signals can travel longitudinally. In this manner, any path along the lower housing 12 is so lengthened that a sonic signal can pass through the formations and be detected by both of the receivers 17 and 18 long before it has had time to travel along the housing.

Turning now to FIG. 2, an enlarged cross-sectional view is shown of the lowermost portion of the lower housing 12 depicted in FIG. 1. Although the particular manner in which the transducers 16–18 are mounted play no part in the present invention, a brief explanation of their arrangement will be of benefit in appreciating the invention. The upper transducer 16 (FIG. 1) is dependently mounted at the upper end of the lower housing 12. The intermediate and lower transducers 17 and 18 are, however, not mounted directly to the housing 12 but are instead dependently suspended below the upper transducer 16. To accomplish this, the lower transducer 18 is mounted on a tubular member 24 and suspended thereon below the upper transducer 16 by a helical spring 25 that is secured at its upper end to the upper transducer. A plurality of flat, annular, vertebrate-like members 26 are disposed around the spring 25 and stacked between the upper and lower transducers 16 and 18, with these members being appropriately distributed above and below the intermediate transducer 17 to position it in the proper relation to the other transducers and its slots 20. The spring 25 is of sufficient strength that the vertebrate members 26 and transducers 17 and 18 are drawn together into a fairly rigid stacked column. To insure that the intermediate and lower transducers 17 and 18 will be exactly opposite their respective slots 20 and 21, adjusting means, such as a threaded nut and sleeve 27, are provided as needed to lengthen or shorten the overall height of the stacked column. It should be noted that the total spiral length of the spring 25 is so much further than the straight-line longitudinal spacing between the transducers 16–18 that sonic transmission along the spring will be delay sufficiently long enough to prevent interference.

The vertebrate members 26 must, of course, also be so arranged that whenever sonic energy that might otherwise be transmitted through the stacked column is either substantially attenuated or else sufficiently retarded as not to interfere with the detection of sonic signals returning to the tool 10 from the earth formations. Briefly, the vertebrate members 26 are, therefore, appropriately arranged to provide a quite substantial attenuation of sonic energy so that an interferring sonic signal will not be transmitted directly therethrough from the transmitting transducer 16 to the receiving transducers 17 and 18.

To accomplish this, the vertebrate members 26 are spaced apart by short longitudinal studs, as at 28 and 29, projecting from one transverse face of each member and which are each received in a complementary recess in the opposed transverse face of the adjacent member. In this manner, although the vertebrate members may even be of metal, the innumerable changes to and from alternating cross-sectional areas along the stack will create such an impedance mismatch at each transition that little or no sonic energy will be transmitted through the stacked members 26. Moreover, each time a sonic signal passing through the stacked members 26 changes direction in the column or is reflected by the impedance mismatch, a portion of the signal will be transmitted into the surrounding media where it will be attenuated.

To enclose the housing 12, a thin, metal sleeve 30 is complementally fitted therein and fluidly sealed at each end thereof, as by a weld bead 31 or the like, to the housing. The upper and lower ends of the housing 12 are, of course, closed by suitable closure members, as at 32 on the bottom.

With the metal sleeve 30 in place within the housing 12, it will be appreciated that to efficiently transfer sonic energy in a radial direction, the enclosed space 33 must be filled with some suitable liquid. Since the velocity of sound through oil is in the order or 4,000–5,000-feet per second, an oil is used to fill the housing 12 since sonic signals cannot be transmitted thereby longitudinally within the housing any faster than they can travel longitudinally through the well bore 13 outside of the tool 10. It will be understood, of course, that since the radial clearance between the transducers 16–18 and the metal sleeve 30 is relatively small, there will be no appreciable effect on the radial transmission and reception of sound.

If the metal sleeve 30 were of a uniform diameter, it would, of course, present an effective path for the transfer of sound longitudinally from the transmitting transducer 16 to the receiving transducers 17 and 18. As fully described, however, in application Ser. No. 381,118, filed July 8, 1964, now Patent No. 3,271,733, by Walter E. Cubberly, Jr., transmission of sonic energy longitudinally along a metal sleeve is greatly attenuated by forming a plurality of transverse convolutions at spaced intervals along the sleeve. Accordingly, to prevent such unwanted longitudinal transmission of sonic energy within the housing 12, the sleeve 30 is convoluted in accordance with the Cubberly invention. To provide as much free internal clearance as possible within the sleeve 30, the convolutions 34 are directed outwardly and formed within each of the transverse slots 22 and 23 in that housing 12. It will be appreciated that the convolutions 34 and the slots 22 and 23 will cooperate to significantly attenuate sonic energy in the same manner as disclosed in the aforementioned Cubberly patent and Schuster patent. It should be noted, moreover, that the sleeve 30 is formed with a uniform diameter section slightly smaller than the internal diameter of the housing 12, as at 35, adjacent to each of the transducers 16–18 so as not to interfere with their operation.

Turning now to the present invention, a floating compensating piston 36 having normally-closed bypass means thereacross, including a check valve 37, is slidably disposed in the lower portion of the housing 12 and normally engaged with a stop, as a housing shoulder 38, above a lateral housing port 39. The enclosed space 33 above the piston 36 is filled through a filling port (not shown) in the upper portion of the housing 12 with a sufficient quantity of a suitable hydraulic oil to displace the piston against the shoulder 38. By arranging the check valve 37 to open under a slight pressure differential to discharge oil from within the enclosed space 33 by way of passage 33a but to remain closed to prevent the entry of well bore fluids therein, it will be appreciated that as the oil expands from an increase in temperature, a sufficient amount of it will be discharged through the check valve to prevent rupture of the metal sleeve 30. On the other hand, as the hydrostatic pressure increases or should the ambient temperature decrease, the piston 36 is, of course, free to move upwardly to maintain the space 33 filled and equalize the pressure in the enclosed space with that in the well bore 13.

It will be appreciated that well bore fluids will be admitted by way of the lateral port 39 into that portion of the housing 12 below the piston 36. Thus, should the piston 36 be displaced upwardly, the internal walls of the housing 12 will be coated with mud and the like from the well bore fluids as the walls are exposed by movement of the piston. Then, whenever the piston 36 is returned to its original position by either a re-expansion of the oil or during the replenishing of the supply during subsequent maintenance, a small residual amount of the mud will most likely remain on the cylinder walls and be passed over by the sealing members, as at 40, on the piston.

It is, of course, undesirable to permit the oil in the space 33 to be contaminated by such foreign material. Accordingly, to prevent contamination of the oil in the enclosed space 33, the piston 36 is provided with interconnected spaced piston portions 41 and 42 and another check valve 43 similar to the check valve 37 already described is mounted in the lower piston portion 42. In this manner, the space 44 between the piston portions 41 and 42 will serve as an intermediate chamber that will trap any contaminants that might pass beyond the lower piston portion 42. It is also expected that the sealing members, as at 45, on the lower piston portion 42 will wipe away a substantial amount of any contaminant clinging on the cylinder wall to greatly reduce the amount of contaminant entering the space 44. Then, as the oil is replenished, an excess amount can be added to the system through the filling port (not shown) to flush any contaminants in the space 44 out through the check valve 43 once the piston is shouldered at 38.

Although the piston 36 could just as well be solid, it will be noted from FIG. 2 that the piston may also be made annular and sealingly disposed around a tubular member 46 through the lower end of the housing 12. In this manner, a passage 47 is provided for electrical conductors 48 leading to other tools (not shown) below the logging tool 10.

The present invention is, of course, not limited to use with sonic logging tools. For example, the pressure-equalizing means of the present invention can also be used in such apparatus as disclosed in application Ser. No. 536,847, filed Mar. 23, 1966, by the present applicant and Walter E. Cubberly.

Accordingly, it will be appreciated that the present invention has provided means for equalizing pressures in a well tool with those exterior thereof as well as accommodating any thermal expansion of the insulating liquid therein. By making the piston member with two or more separate portions and providing bypass means across each, the risk of contaminants entering the oil-filled space in the tool is reduced.

While a particular embodiment of the present invention has been shown and described, it is apparent that changes and modifications may be made without departing from this invention in its broader aspects; and, therefore, the aim in the appended claims is to cover all such changes and modifiations as fall within the true spirit and scope of this invention.

What is claimed is:

1. In a well tool including a body having an enclosed compartment therein, means on said tool for maintaining the pressure in said compartment at a predetermined relation to the pressure of well fluids exterior of said well tool comprising: a piston chamber; a piston member dividing said chamber into first and second portions and arranged for travel therein between first and second spaced positions; first passage means between said first chamber portion and said compartment; a hydraulic fluid filling said compartment, said first passage means, and said first chamber portion; second passage means admitting well fluids into said second chamber portion for urging said piston member toward its said first position to develop a corresponding pressure in said compartment; and relief means responsive to thermal expansion of said hydraulic fluid for discharging a sufficient volume of said hydraulic fluid to limit the increase of pressure in said compartment to a predetermined differential above the exterior pressure.

2. The well tool of claim 1 wherein said piston member includes first and second piston portions spaced apart and connected to define an enclosed space therebetween; and wherein said relief means include first and second normally-closed valve means respectively mounted in said piston portions and selectively operable upon travel of said piston member to its said second position and an increase of pressure in said compartment to said predetermined differential to each open and respectively discharge hydraulic fluid from said first chamber portion into said enclosed space and from there into said second chamber portion.

3. The well tool of claim 1 wherein said relief means include normally-closed valve means across said piston member and selectively operable to open upon travel of said piston member to its said second position and an increase of pressure in said compartment to said predetermined differential.

4. The well tool of claim 3 wherein said valve means is mounted in said piston member for discharging said hydraulic fluid from said first chamber portion to said second chamber portion.

5. In a well tool including a body having an enclosed compartment therein, means on said tool for maintaining the pressure in said compartment at a predetermined relation to the pressure of well fluids exterior of said well tool comprising: a piston chamber; a piston member having first and second spaced piston portions dividing said piston chamber into first and second portions at opposite ends of said piston member respectively and an enclosed space therebetween, said piston member being arranged for travel in said piston chamber between first and second spaced positions; stop means for preventing travel of said piston member from said first position beyond said second position; first passage means between said first chamber portion and said compartment; a hydraulic fluid filling said compartment, said first passage means, and said first chamber portion; second passage means admitting well fluids into said second chamber portion for urging said piston member toward its said first position to develop a corresponding pressure in said compartment; and means responsive to thermal expansion of said hydraulic fluid for discharging a sufficient volume of said hydraulic fluid to limit the increase of pressure in said compartment to a predetermined differential above the exterior pressure including first and second normally-closed check valve means respectively mounted in said first and second piston portions and respectively arranged to open only whenever said piston member has reached its said second position and the pressure in said compartment has reached a predetermined differential above the pressure in said enclosed space and the pressure in said enclosed space has reached a predetermined differential above the pressure in said second chamber portion.

References Cited

UNITED STATES PATENTS

| | | | |
|---|---|---|---|
| 2,673,527 | 3/1954 | Ashton et al. | 138—31 X |
| 2,876,799 | 3/1959 | Mercier | 138—31 |
| 2,880,746 | 4/1959 | Bernotas | 138—31 X |
| 2,937,663 | 5/1960 | Ashton et al. | 138—31 |

FOREIGN PATENTS 956,394   8/1949   France.

DAVID H. BROWN, *Primary Examiner.*